Figure 1:
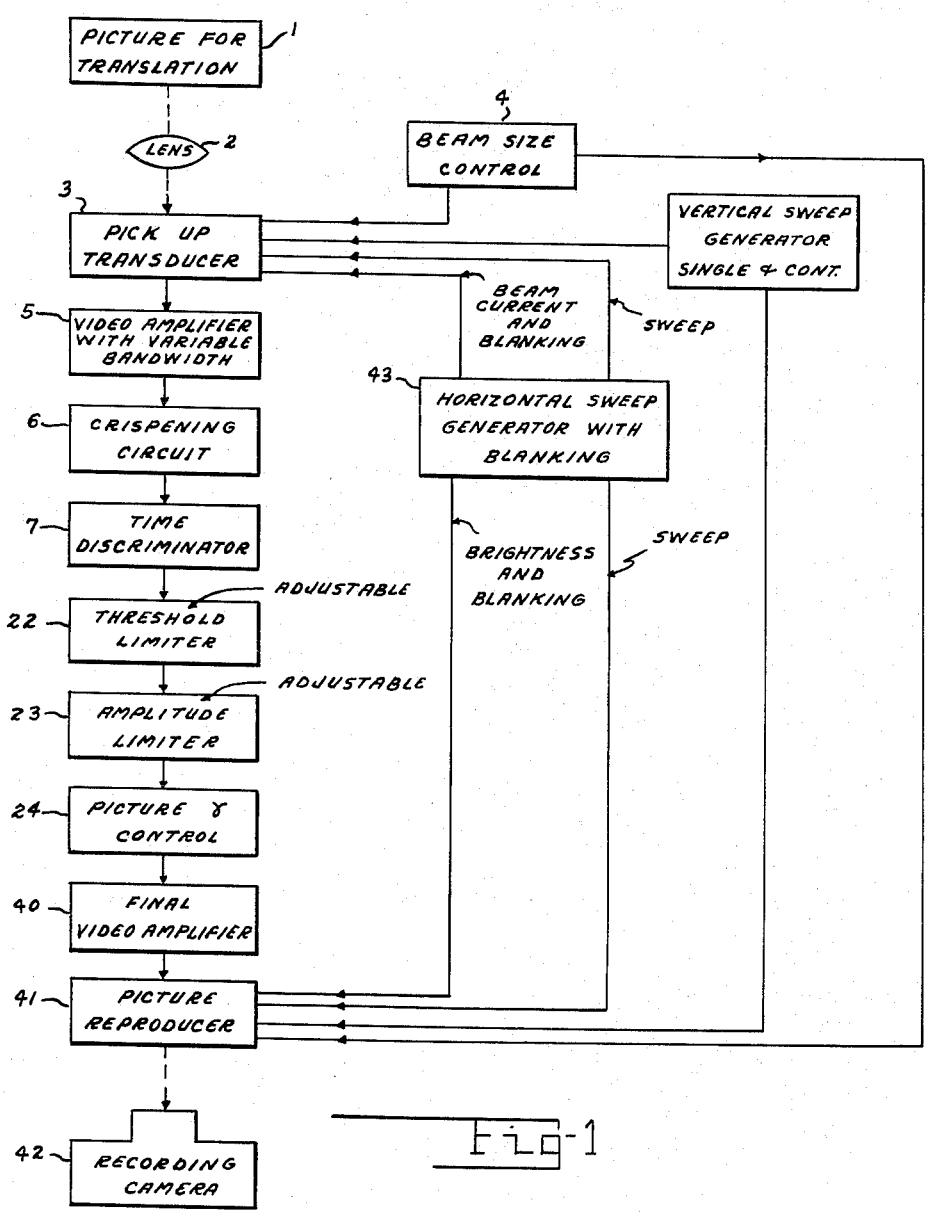

Dec. 24, 1963  R. K. H. GEBEL  3,115,545
GRAIN SPACING TO LIGHT INTENSITY TRANSLATOR
FOR PHOTOGRAPHIC ENLARGEMENTS
Filed Sept. 18, 1962  8 Sheets-Sheet 3
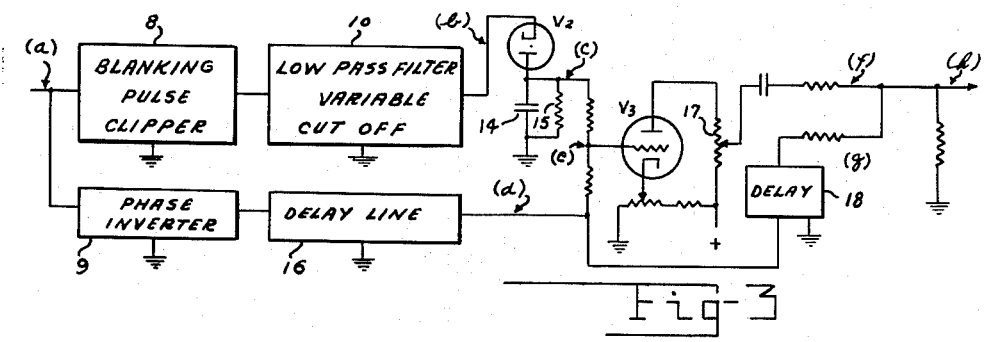
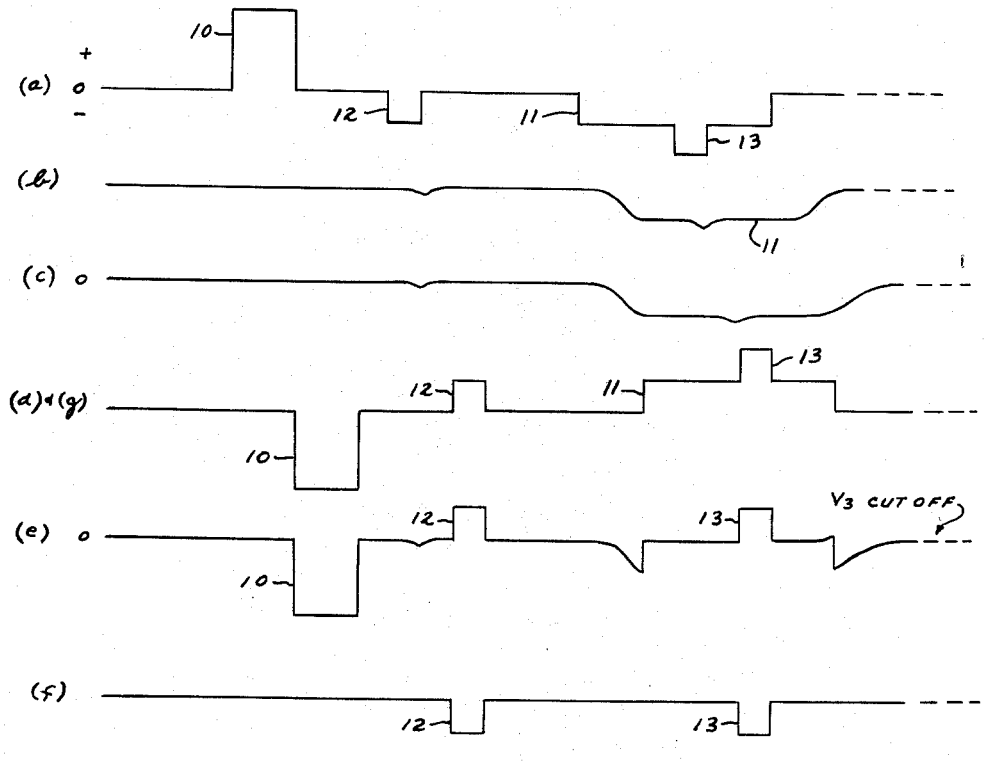
INVENTOR.
R. K. H. GEBEL
BY
ATTORNEY
AGENT INVENTOR.
R. K. H. GEBEL
BY Wade Koontz
ATTORNEY
James L. Shannon
AGENT United States Patent Office 3,115,545
Patented Dec. 24, 1963

3,115,545
GRAIN SPACING TO LIGHT INTENSITY TRANSLATOR FOR PHOTOGRAPHIC ENLARGEMENTS
Radames K. H. Gebel, Dayton, Ohio, assignor to the United States of America as represented by the Secretary of the Air Force
Filed Sept. 18, 1962, Ser. No. 224,575
6 Claims. (Cl. 178—6.8)
(Granted under Title 35, U.S. Code (1952), sec. 266)

The invention described herein may be manufactured and used by or for the United States Government for governmental purposes without payment to me of any royalty thereon.

Ordinary photography is based on the latent change in silver chloride (AgCl) or silver bromide (AgBr) produced by the absorption of light. The AgCl or AgBr molecules which have absorbed sufficient light are transformed by the developer into colloidal silver. The silver salt molecules which have not absorbed sufficient light are removed by the fixing salt solution. Hence, the amount of light absorbed by a photographic emulsion determines the spacing of the developed silver grains and therewith the transparency of the photographic plate. If the photographic picture is sufficiently enlarged, the grain spacing structure which results from exposure can be observed.

Low contrast pictures which have been very much enlarged so that the grains are clearly visible are difficult for the human eye to discriminate since the eye tends to notice the grain by itself instead of integrating over many grains and translating and transmitting to the brain the brightness value represented by grain spacing. For example, the photograph of a star of very low brightness, say the 20th magnitude, is not easily interpreted from such enlargements since it is represented simply by an area in which the silver grain spacings are less than in the surrounding area.

Therefore, it may be said that in very great enlargement of photographic plates the brightness information is the average spacing between silver grains. It is the purpose of this invention to provide apparatus for translating this average spacing into a gray scale representation of the object's brightness which may be interpreted by the human eye.

Briefly, the above is accomplished by converting the enlarged photographic image into a video signal by means of a television pickup transducer which differs from ordinary transducers in that the cross-sectional area of the scanning spot is larger so that it covers an area corresponding to ten to twenty grains of the enlarged photograph, and in that the scanning spot does not move from one side of the picture to the other with uniform speed as is ordinarily done, but jumps from one elemental area to the next adjacent area. The scanning spot is blanked during its motion to prevent the use of the same grains several times in deriving the brightness information. After processing to remove spurious components and after subjection to a variable gamma control, the video signal is applied to a picture reproducer which displays the signal as a gray scale representation of the distribution of average silver grain spacing in the original enlarged photograph.

The translator is particularly useful in the interpretation of celestial photographs. Another promising use is in the interpretation of photographs of the surfaces of the moon and the planets taken at relatively close range by cameras carried by artificial satellites or space vehicles and later recovered. Because of the high resolution of photographic plates this method will yield far more information than can be transmitted by the best television systems now available.

Figure 2:
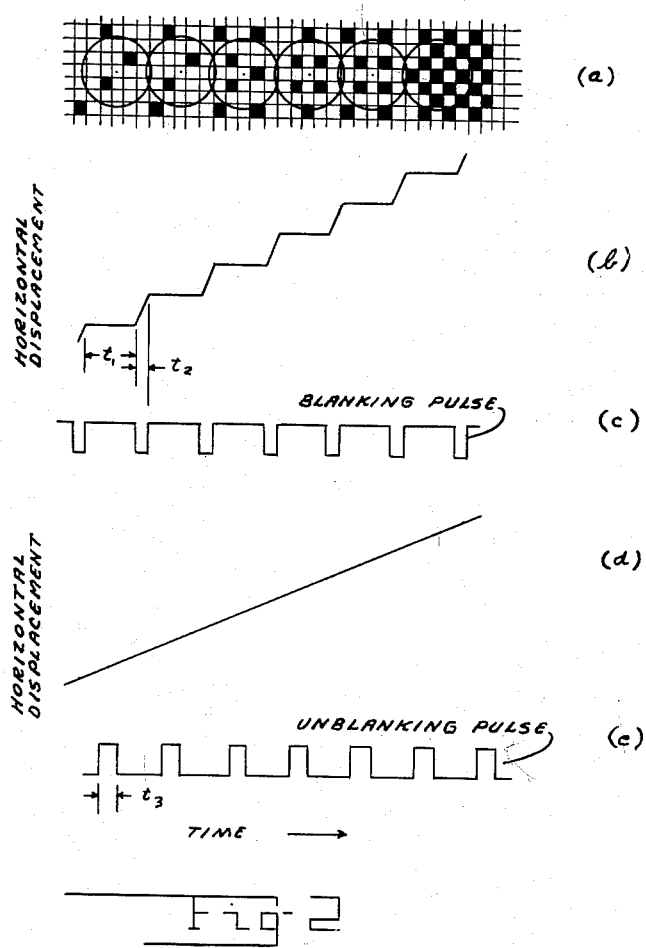
Figure 5:
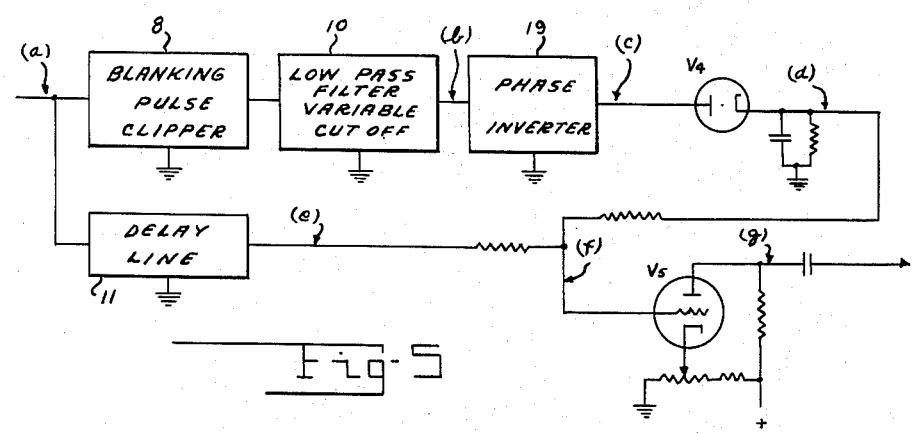
Figure 6:
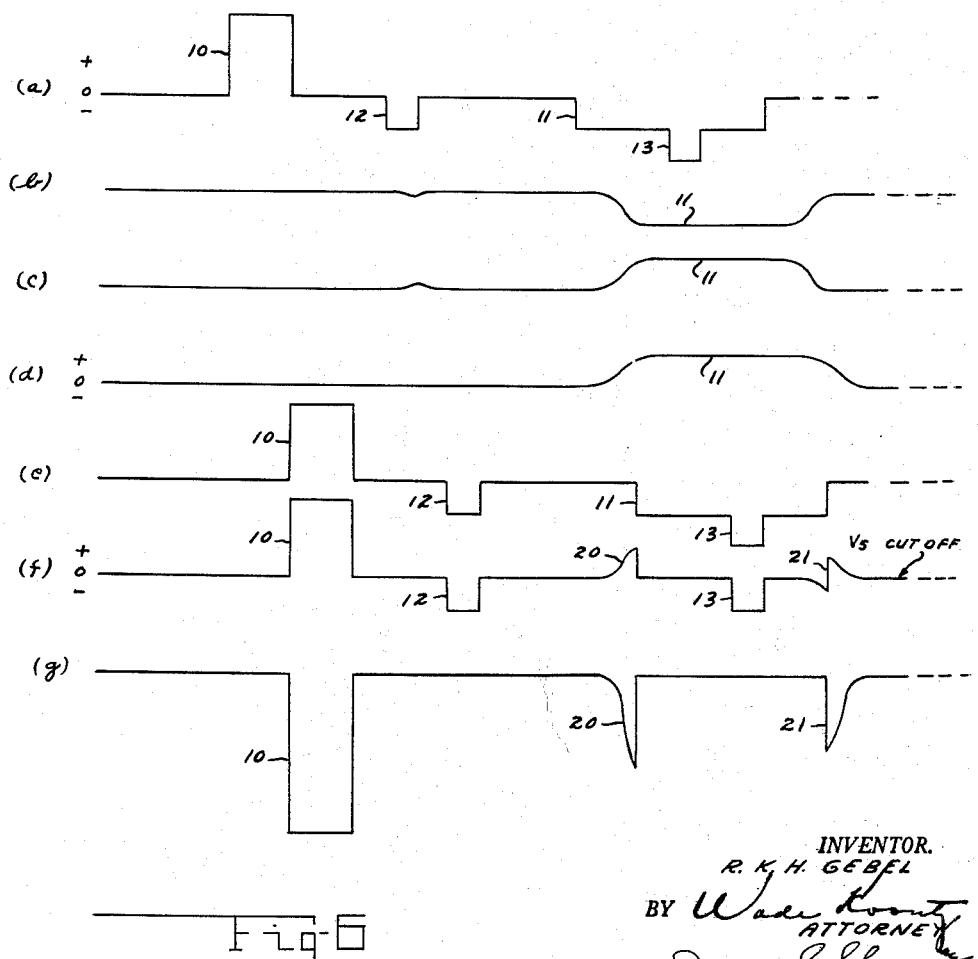
Figure 7:
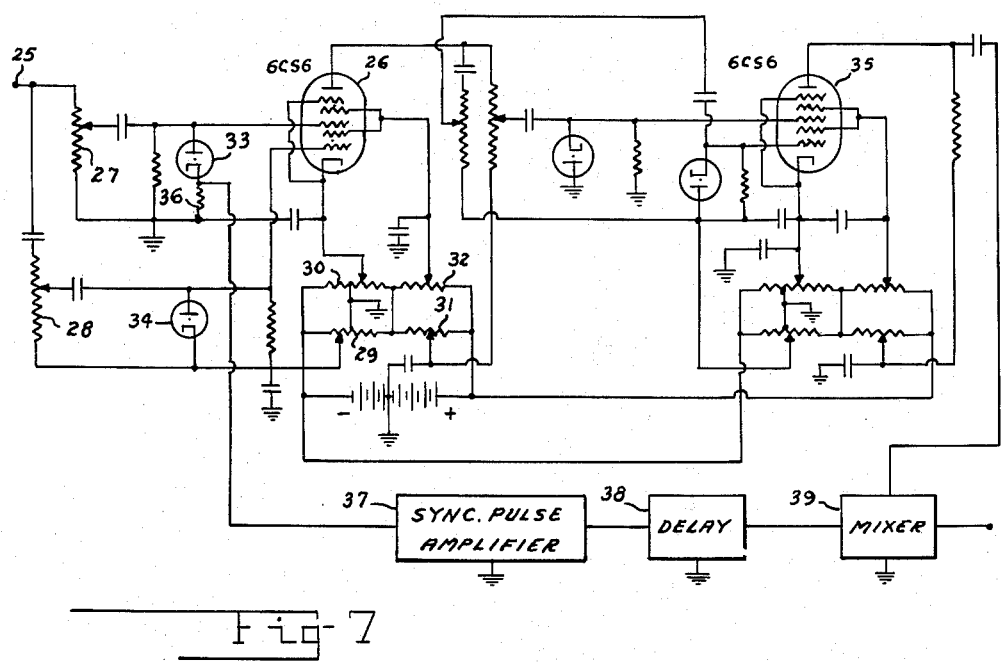
Figure 8:
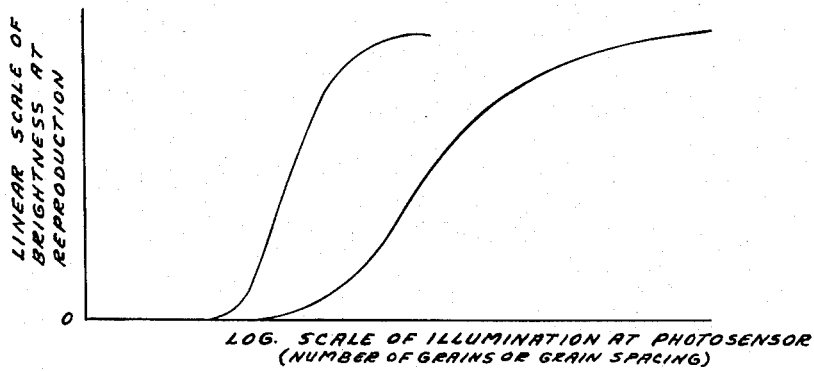
Figure 9:
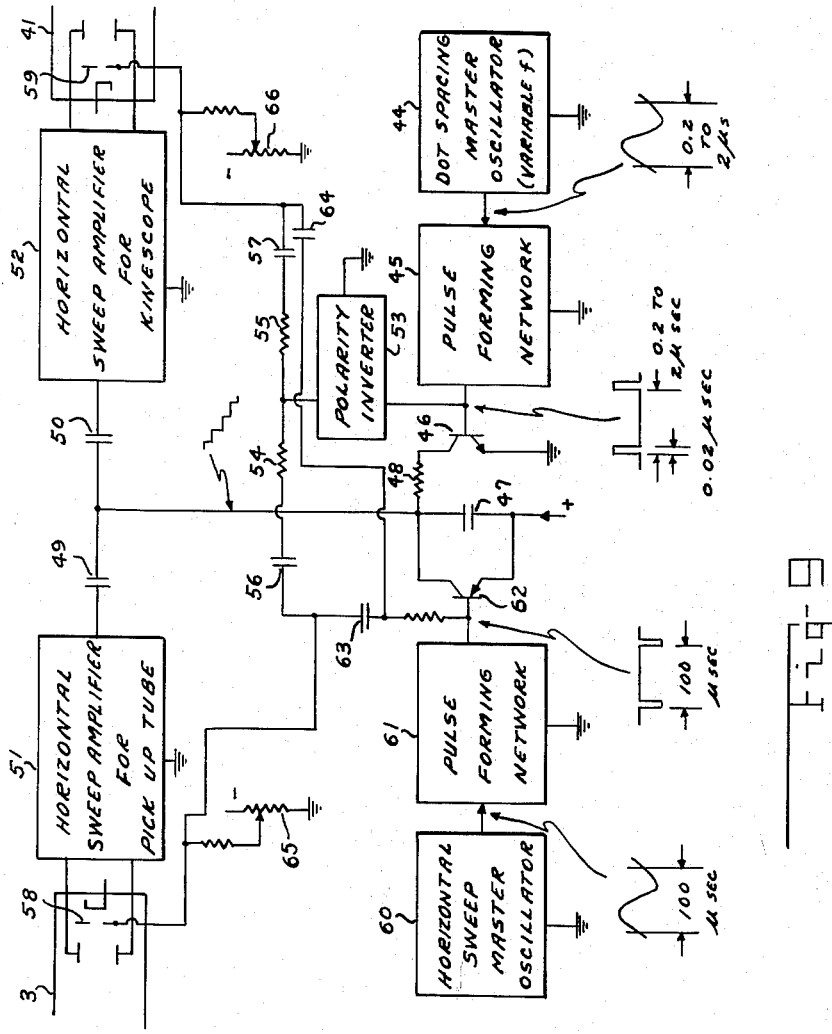
Figure 10:
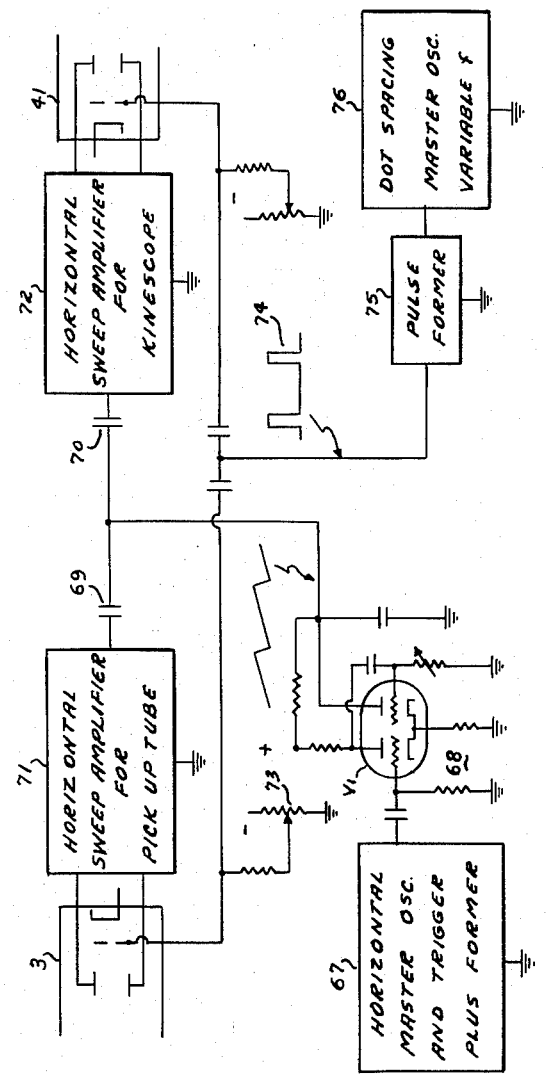
Figure 11:
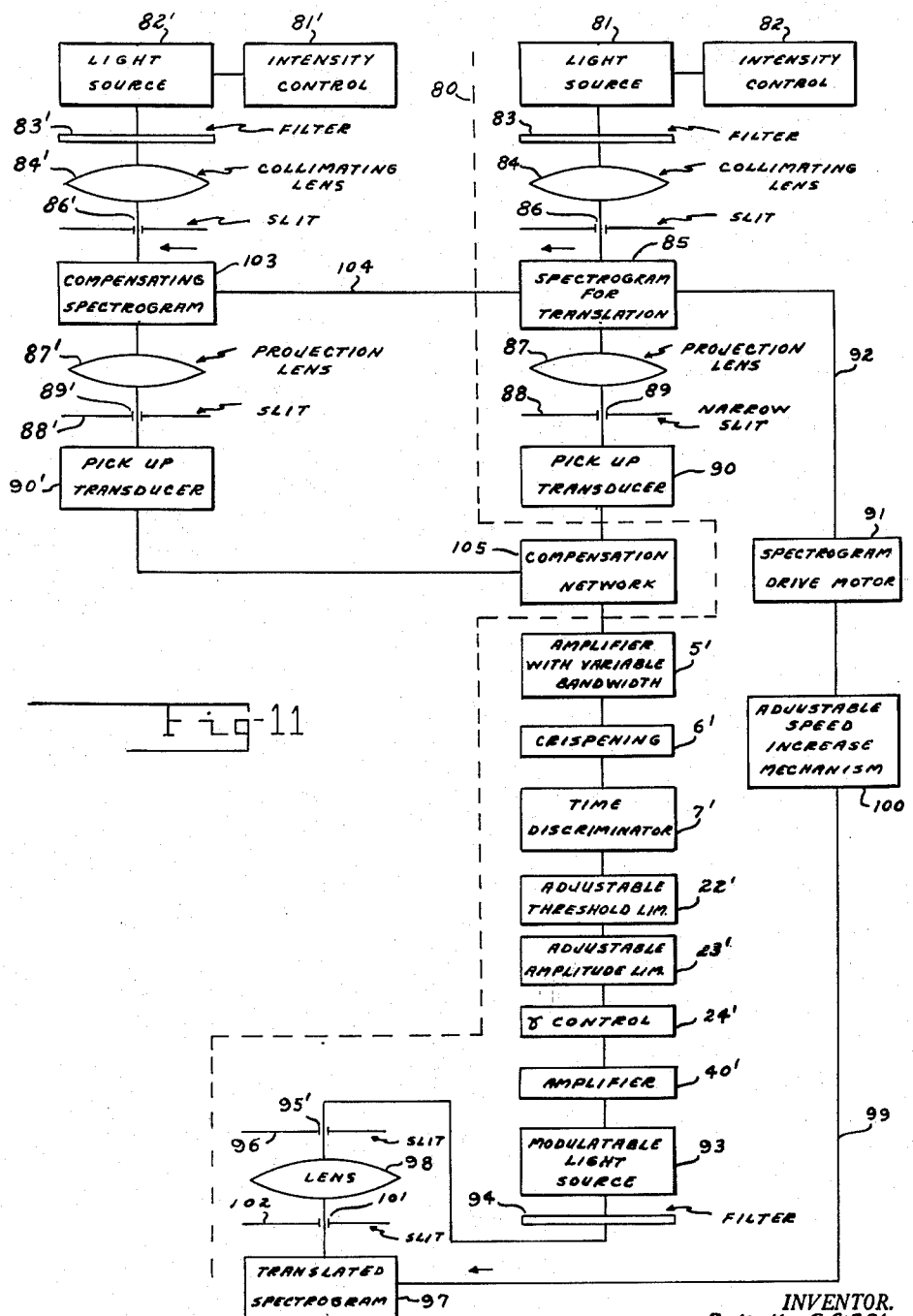

The invention will be described in more detail with reference to the specific embodiment thereof shown in the accompanying drawings in which:

FIG. 1 is a block diagram of a translator in accordance with the invention,
FIG. 2 illustrates the scanning process in FIG. 1,
FIGS. 3 and 4 illustrate one form of the time discriminator of FIG. 1,
FIGS. 5 and 6 illustrate another form of the time discriminator of FIG. 1,
FIGS. 7 and 8 illustrate a suitable embodiment of the gamma control of FIG. 1,
FIGS. 9 and 10 show suitable horizontal scanning circuits for FIG. 1, and
FIG. 11 illustrates the application of the invention to the translation of spectrograms.

Referring to FIG. 1, the rectangle 1 represents a photograph enlarged to the point where the individual grains are discernible to the eye. This photograph would normally be an enlargement of a negative transparency and therefore would normally be in the form of a positive transparency or print, although it could equally well be a negative transparency or print. Using a suitable optical system, represented by lens 2, an optical image of the enlarged photograph is formed on the light sensitive member of the pickup transducer 3. The transducer 3 may be any suitable television pickup tube such as the image orthicon or the vidicon, the latter offering certain advantages in simplifying the sweep circuits due to its electrostatic deflection. The purpose of the transducer is to convert the light pattern in the received optical image into a video signal. In the image orthicon and also in the vidicon this is accomplished by converting the light pattern in the optical image into a corresponding positive charge pattern on the flat surface of a target electrode within the tube. This surface is then scanned by a beam of low velocity electrons which neutralize the charges as the beam passes over the surface. The beam electrons in excess of those required to neutralize the positive charge are returned to an electron multiplier, the output of which constitutes the video signal.

Considering further the operation of the pickup tube in the present system, the surface of the target electrode on which the positive charge pattern is formed may, for illustrative purposes, be considered to be made up of a plurality of elemental areas each corresponding to a grain in the original photographic enlargement. Thus, in FIG. 2(a) which illustrates a small portion of the target electrode surface, each elemental square represents the location of a light sensitive silver salt grain in the enlarged photograph. Depending upon the type of pickup tube employed, i.e. the number of phase reversals occurring in the tube, the presence of a silver grain at any point in the photograph will cause the corresponding elemental area on the target electrode to have either a positive charge or no charge. For convenience, it will be assumed that the presence of a silver grain at any point in the photograph will cause zero charge to appear at the corresponding target electrode elemental area and this condition of zero charge will be illustrated by making the elemental area black in FIG. 2(a); and, at any point in the enlarged photograph where no silver grain appears, meaning that the grain of silver salt at that point did not receive sufficient light and was removed by the developer, the corresponding elemental area on the target electrode will receive a positive charge and appear light in FIG. 2(a). Therefore the small strip of target electrode in FIG. 2(a) in which the average spacing of zero charge (black) areas decreases from left to right represents a corresponding strip of the enlarged photograph in which the silver grain spacings decrease in an identical manner.

As stated earlier, the average spacing of the silver grains in the enlarged photograph constitutes the desired brightness information. It is desired that the pickup transducer convert this average spacing into a video signal of proportionate magnitude. To accomplish this the beam of the pickup tube is made sufficiently large in cross-section to cover a number of elemental areas on the target electrode, 15 to 20 or more for example. This may be accomplished by slightly defocussing the beam by beam size control 4. The size of the beam relative to the elemental areas of the target electrode is illustrated in FIG. 2(a) where the beam is shown by circles in six successive positions in a horizontal scanning line.

The preferred horizontal scanning motion of the beam is in accordance with graph (b) of FIG. 2. The beam rests in one horizontal position during the interval $t_1$ at the end of which it is rapidly moved to the next horizontal position during the much shorter interval $t_2$. During the intervals $t_2$ the beam is blanked by the blanking pulses shown at (c) in FIG. 2. A simpler method of horizontal scanning which gives almost as good results is illustrated at (d) and (e) in FIG. 2. Here the blanked beam is moved at a uniform rate along the horizontal line as illustrated at (d) and is unblanked for a short interval $t_3$ at each horizontal position by the unblanking pulses at (e). The time $t_3$ is made small enough that little horizontal movement of the beam occurs during this interval. In either case the distance between adjacent horizontal positions of the beam is preferably made slightly less than the beam spot diameter in order to produce a slight overlap, as shown at (a).

In each position the beam neutralizes the positive charge in the area covered by the beam spot. As stated earlier, the video signal is constituted by the excess of beam electrons over those required to neutralize the charge in the area covered by the beam. Hence the magnitude of the video signal at each position of the beam is inversely proportional to the sum of the charges in the 20 or so elemental areas covered by the beam spot. Therefore, in effect, the pickup tube at each position of the beam performs an integration of the charges in the elemental areas included in the beam spot and produces a video signal inversely proportional to the value of the integral. As apparent from FIG. 2(a) the total charge at any beam position is directly proportional to the average spacing between the elemental areas of no charge (black) and therefore, in the example given, to the average spacing between silver grains in the enlarged photograph. The magnitude of the video signal is therefore inversely proportional to the average spacing between silver grains in the photograph. It may be made directly proportional to this spacing by a simple phase inversion.

This video signal, after suitable amplification, may be applied directly to a kinescope or other picture reproducer for producing a gray scale display of the average grain spacing, provided the brightness range of the picture reproducer is not less than the magnitude range of the video signal. Normally, however, the video signal will be operated upon in a number of ways before display in order to remove undesired components and to control its magnitude range. These will be discussed in the following paragraphs.

The video signal leaving the pickup device 3 is first applied to a video amplifier 5 of adjustable bandwidth for amplifying the signal and in addition removing certain spurious components of very short duration such as may be due to scratches on the photographic plate. By restricting the high frequency response of the amplifier, very sharp short duration pulses may be removed from the signal.

The restriction of bandwidth in amplifier 5 has the disadvantage of increasing the rise time of the useful video signal. To offset this a crispening circuit 6 may be used to effect an apparent decrease in the rise time. Circuits for accomplishing this result are known in the art. One such circuit is shown and described in the Proceedings of the I.R.E. for October 1951, pages 1314–1322, in an article entitled "A New Technique for Improving the Sharpness of Television Pictures" by Goldmark and Hollywood.

Spurious components in the video signal of greater duration than those removed by amplifier 5, which may be caused for example by imperfections in the photographic emulsion, are removed by time discriminator 7. Time discrimination may be used since these components are of less duration than the desired brightness information components of the signal. One suitable circuit for this purpose is shown in FIGS. 3–4 and another in FIGS. 5–6. The second circuit performs the additional function of modifying the video signal in such a way that when displayed in the picture reproducer only the boundary lines between areas of different brightness in the photographic enlargement are shown. This feature is often useful in analyzing photographs of topography.

Referring to FIGS. 3–4, the video output of circuit 7 is applied to blanking pulse clipper 8 and phase inverter 9. For illustrating the operation of the circuit, its performance with a simple video signal such as shown at (a) in FIG. 4 will be described. This signal, which represents only part of one horizontal line, comprises a blanking pulse 10, an information pulse 11 and two spurious pulses 12 and 13 of considerably shorter duration than the information pulse. After removal of the blanking pulse by clipper 8, the signal is applied to variable cutoff low pass filter 10. This filter will not pass pulses having a duration less than a predetermined value depending upon the time constant of the filter. This time constant may be adjusted by adjusting the cut-off frequency of the filter and is made long enough to exclude pulses such as 12 and 13 but not long enough to block the information pulse 11. Consequently, the waveform at the output of the filter is as shown at (b) in FIG. 4. As seen, pulse 11 is delayed and its rise time considerably increased by the filter.

The output of filter 10 is applied through diode $V_2$ to a time constant network consisting of capacitor 14 and resistor 15. Diode $V_2$ serves two functions: one is to give the capacitor 14 a much shorter charging time than its discharge time and the other is to restore the direct current component to the wave at point (c). The waveform at this point is illustrated in FIG. 4(c). It is seen that the leading edge of the pulse 11 follows very closely the leading edge of pulse 11 in waveform (b) since this represents the charging of capacitor 14 through diode $V_2$. However, the rate at which the pulse dies out at its trailing edge is determined by the time required for capacitor 14 to discharge through resistor 15. This time constant is made long enough to considerably stretch out the trailing edge, as shown at (c) in FIG. 4.

The original video signal at (a) is also reversed in phase by network 9 and delayed by the proper amount in delay line 16 for it to have the time relation to waveform (c) shown at (d) in FIG. 4. Waves (c) and (d) are then added to produce the waveform (e) at the grid of $V_3$. This tube is operated at cut-off so that only the positive-going portions of wave (e) appear in the waveform at (f). Level control 17 is adjusted to cancel the gain introduced by tube $V_3$. The waveform at (f) contains only the undesired components 12 and 13 of the original signal.

The original video signal minus the undesired components is then obtained by adding waveforms (f) and (g) to produce the waveform (h), the undesired components cancelling since they are of equal amplitudes and opposite phases in the waves (f) and (g). The waveform at (g) is identical to that at (d) except for a very small delay, equal to that produced by $V_3$, introduced by network 18. The same graph has therefore been used to illustrate both waveforms in FIG. 4.

Another form which the time discriminator may take is shown in FIGS. 5 and 6. In addition to removing the undesired components from the video signal, this circuit also modifies the desired components of the signal in such a way that, when displayed by the picture reproducer, only the boundary lines between areas of different brightness are shown. This type of reproduction is sometimes advantageous in analyzing topographical photographs. The circuit of FIG. 5 is very similar to the circuit of FIG. 3. The waveform at (d) is obtained in exactly the same manner as the waveform at (c) in FIG. 3 except that it is reversed in phase due to the presence of the phase inverter 19. Diode $V_4$ serves the same function as diode $V_3$ in FIG. 3 but is oppositely poled since a positive-going wave is desired at point (d). The original signal is delayed by delay line 16 by the correct amount to establish the time relationship of wave (e) to wave (d) shown in FIG. 6. Waves (e) and (d) are then added to produce the waveform (f) at the grid of $V_5$. As shown in FIG. 6(f), $V_5$ is biased to cut-off thus removing the undesired negative-going components 12 and 13. The sharp pulses 20 and 21, which result from the addition of waves (d) and (e), and blanking pulse 10 appear in the output of $V_5$ amplified and reversed in phase, as shown in FIG. 6(g). The pulses 20 and 21 mark the edges of pulse 11 and produce the boundary line between areas of different brightness in the reproduced picture.

The video signal leaving the time discriminator may be subjected to threshold limitation, amplitude limitation and gamma control as required to control the lower and upper magnitude limits and the magnitude range. The lower magnitude limit is set by the threshold limiter 22 and the upper magnitude limit is set by amplitude limiter 23. Any suitable limiters for these purposes may be used such as biased diodes or biased grid controlled vacuum tubes. A suitable circuit for gamma control 24 is shown in FIG. 7. The video signal at input terminal 25 is applied to the first and third grids of a pentagrid amplifier 26, such as the 6CS6, through level adjusting potentiometers 27 and 28. Potentiometers 29 and 30 are provided for adjusting the biases of the first and third grids, respectively, while potentiometer 31 controls the anode potential and potentiometer 32 the common potential of the second and fourth grids. Diodes 33 and 34 are for direct current component restoration. The second stage built around a second pentagrid amplifier 35 is identical to the first. Due to the phase reversal produced by stage 26, one stage is used to control the overall characteristic for the lower portion of the signal and the other stage is used to control the characteristic for the upper portion of the signal. By proper adjustment of the various controls the signal magnitudes and the working points of the control grids may be so selected as to provide a wide variety of non-linear relationships between input signal magnitude and output signal magnitude. Since the polarity of the synchronizing pulse in the video signal is of opposite polarity to the information portion, it may be clipped or badly distorted by the gamma control circuit. In order to restore the synchronizing pulse in the output signal, the synchronizing pulse, which appears across a small resistor 36, is amplified by amplifier 37, delayed by element 38 sufficiently to equal the delay in the gamma control circuit, and combined with the output of the gamma control circuit in mixer 39.

By using the gamma control circuit in the system of FIG. 1, a non-linear relationship is established between the illumination at the photosensor in transducer 3 and brightness at the reproducer, as required to fit the range of illumination intensity at the photosensor to the brightness range of the reproducer. This permits a display of the entire brightness range of the photograph being translated. FIG. 8 illustrates two possible non-linear relationships, established by the gamma control, between illumination at the photosensor and brightness at the reproducer. The illumination at the photosensor may be expressed either as silver grain density or silver grain spacing depending upon whether the original photograph is a negative or a positive.

The output of gamma control circuit 24, after suitable amplification in amplifier 40, is applied to picture reproducer 41 which converts the video signal into a gray scale representation of the variation in grain spacing in the original enlarged photograph. The picture reproducer may be of any suitable type. An electron beam type such as a cathode ray tube kinescope is preferred, but reproducers using a modulated light source and mechanical scanning may be employed. The reproduced picture may be recorded by camera 42.

It is not necessary that all of elements 5, 6, 7, 22, 23 and 24 be used, but they may be used in any combination as required. As stated earlier, they may all be omitted and the output of transducer 3, after suitable amplification, may be applied directly to the picture reproducer under certain circumstances.

FIGS. 9 and 10 show two forms which the horizontal sweep generator 43 of FIG. 1 may take. The circuit of FIG. 9 produces a stepped horizontal deflection of the beam as shown in FIG. 2(b). In this circuit a dot spacing master oscillator 44 is provided to establish the interval between steps. The sine wave output of this oscillator is changed by a suitable pulse forming network 45 into a series of identical pulses of short duration having a repetition interval equal to the oscillator period. These pulses are applied to the base of transistor 46 permitting the condenser 47 to increase its charge in steps through resistor 48 and the collector-emitter circuit of the transistor. The stepped voltage across condenser 47 is applied through blocking condensers 49 and 50 to the horizontal sweep amplifiers 51 and 52 of the pickup tube and the kinescope, respectively, for the production of stepped sweep voltages. The output pulses of network 45 are also used as blanking pulses by reversing their polarity in network 53 and applying the resulting negative pulses through resistors 54 and 55 and condensers 56 and 57 to the beam intensity control electrodes 58 and 59 of the pickup tube and the kinescope. In this manner the beam is blanked during its movement to the next adjacent horizontal position. Oscillator 60 operates at the scanning line frequency. Its sine wave output is applied to pulse forming network 61 to produce a series of short duration negative pulses having a repetition interval equal to the period of oscillator 60. The output pulses from network 61 are applied to the base of transistor 62 and through blocking condensers 63 and 64 to the beam intensity control electrodes of the pickup tube and the kinescope. Each pulse at the base of transistor 62 renders this transistor conductive permitting a rapid discharge of condenser 47 through its collector-emitter circuit and producing horizontal retraces of scanning beams. The beams are blanked during retrace by the application of these pulses to the grids 58 and 59. Potentiometers 65 and 66 are beam intensity controls.

The circuit of FIG. 10 produces a fixed rate horizontal deflection of the beams as illustrated in FIG. 2(d). Here, a horizontal oscillator and pulse forming circuit 67, operating at the horizontal line frequency, synchronizes a monostable multivibrator sawtooth waveform generator 68. The resulting sawtooth wave is applied through blocking condensers 69 and 70 to the inputs of sweep amplifiers 71 and 72 for the generation of sweep voltages for the pickup tube and the kinescope. The beams in both tubes are biased to cutoff by potentiometer 73. Unblanking pulses 74 are produced by pulse forming network 75 from the sine wave output of oscillator 76. The frequency of oscillator 76 is much higher than that of oscillator 67 and is determined by the beam size and horizontal scanning velocity. This frequency is so selected that the beam moves a horizontal distance substantially equal to the beam diameter between successive unblanking pulses. This relationship is illustrated at (a) and (e) in FIG. 2.

The vertical sweep circuits, represented by the correspondingly labeled block in FIG. 1, may be conventional in all respects and may provide a single or continuous sweep as desired.

While the translator has been described as a device for analyzing photographic enlargements it also has other related uses. For example, in very faint spectrograms where the contrast is too low for the spectral lines to be easily recognized, it may be used to convert the silver grain spacing information into a visually readable spectrogram. The procedure is the same as that illustrated in FIG. 1 with special adaption to spectrograms. For a spectrogram of a luminous object the apparatus may be as shown to the right of dashed line 80 in FIG. 11. Here a light source 81, intensity control 82 and filter 83 produce an adjustable source of monochromatic light which is collimated by lens 84. The collimated light is admitted to the spectrogram 85, which in the illustrated case is a transparency, through a moderately narrow slit 86. An image of the illuminated portion of the spectrogram is formed by lens 87 on plate 88 in the area including a very narrow slit 89. Although the slit is narrow in the longitudinal direction of the spectrogram it is as wide as the spectrogram in the transverse direction, i.e., normal to the paper in FIG. 11. Although the slit is very narrow, it has sufficient area, because of its length, to include the images of a relatively large number of silver grains in the spectrogram transparency 85. Therefore the light that passes the slit and reaches the pickup transducer 90 is directly related to the spacing between silver grains in that section of the spectrogram transparency imaged in the slit 89. The output of the transducer 90, which may be a photomultiplier, for example, is therefore a current proportional to the grain spacing. The spectrogram 85 is caused to move by the narrow slit 89 at a constant rate and in its longitudinal direction, i.e. in the direction transverse to the spectral lines, by a suitable drive motor 91 and mechanical coupling 92. Therefore, in effect, the spectrogram is scanned along its λ or wavelength axis at a constant rate by the narrow slit 89.

The output signal of transducer 90 is operated upon by elements 5', 6', 7', 22', 23', 24' and 40' which correspond to and operate in the same manner as the elements of matching numbers in FIG. 1. Where the contrast of the original spectrogram is low the threshold limiter 22' may be used to increase the signal-to-background ratio of the transducer output and thus provide increased contrast in the translated spectrogram. The output of amplifier 40' modulates a light source 93 which is made monochromatic by filter 94. The modulated monochromatic light passed by slit 95 in masking plate 96 is concentrated on the photographic plate 97 by lens 98. This plate is moved in the transverse direction of slit 95 by a coupling 99 driven through speed control mechanism 100 by motor 91. The lens 98, which is preferably cylindrical, forms an image of slit 95 on plate 97 that is reduced in width to equal the width of slit 89 multiplied by the ratio of the speed of movement of plate 97 to the speed of movement of spectrogram 85. The light to form this image passes through a slit 101 in masking plate 102.

The translated spectrogram is formed on photographic plate 97 which moves at constant speed past the image of slit 95. If it is desired to expand the translated spectrogram along its λ or wavelength axis, this may be accomplished by increasing the speed of plate 97 relative to the speed of spectrogram 85. The driving mechanism, which comprises elements 91, 92, 99 and 100 may be of any suitable type. For example, elements 92 and 99 may be lead screws and element 100 may be a gear change mechanism for changing the speed of lead screw 97 relative to that of lead screw 92.

If the spectrogram to be translated is a reflection spectrogram, i.e., one made of the light reflected from a sample and having light (unexposed) lines at the absorbed wavelengths, the apparatus to the left of line 80 in FIG. 11 is added to the above-described apparatus to the right of this line. In a reflection spectrogram the density will vary along the λ axis in the same manner that the intensity of the light source used to illuminate the sample varies with wavelength. The purpose of the apparatus to the left of line 80 is to compensate for this density variation so that it does not appear in the translated spectrogram.

To accomplish the above, a compensating spectrogram 103 is made of the light source used to illuminate the sample in making the reflection spectrogram 85. The compensating spectrogram is moved past slit 86' in the same manner that spectrogram 85 is moved past slit 86, a suitable coupling 104 being provided for this purpose. Elements 81', 82', 83', 84', 86', 87', 88', 89' and 90' all perform the same functions as the correspondingly numbered elements to the right of line 80, previously explained. Therefore, the nonuniformity in the output of transducer 90 due to the nonuniformity of the intensity vs. wavelength characteristic of the light source used in the making of the reflection spectrograph appears isolated in the output of transducer 90'. This permits the output of transducer 90' to be subtracted from the output of transducer 90 in compensating network 105 to produce a signal that is independent of the intensity vs. wavelength characteristic of the light source used in making the spectrogram 85.

I claim:

1. Apparatus for producing a gray scale representation of the variation in the average silver grain spacing in a low contrast spectrogram, said spectrogram being in the form of a photographic transparency and having a wavelength axis with spectral lines at right angles thereto, said apparatus comprising: a transducer for converting incident light into an electrical signal of magnitude proportional to the light intensity; means for illuminating said spectrogram with collimated monochromatic light; an opaque plate having a narrow slit; means forming an image of said illuminated spectrogram on said plate with the wavelength axis of the spectrogram normal to said narrow slit; said illuminating means, said spectrogram, said plate and said transducer being so positioned that light passing through the spectrogram and the narrow slit falls on said transducer; a modulatable source of monochromatic light; a transmission network having an adjustable threshold and an amplifier connected in cascade between said transducer and said modulatable light source; a photographic plate; means providing a light transmitting slit situated between said modulatable light source and said photographic plate; a lens situated between said slit and said photographic plate for forming an image of said slit of predetermined width on said photographic plate; and means for simultaneously moving said spectrogram and said photographic plate relative to said narrow slit and said slit image, respectively, at constant speeds and in directions at right angles to said slit and slit image, the ratio of the said predetermined width of said slit image to the width of said narrow slit being the same as the ratio of the speed of said photographic plate to the speed of said spectrogram and being greater than unity.

2. Apparatus for producing a gray scale representation of the variation in the average silver grain spacing in a low contrast spectrogram made of the light reflected from a sample illuminated from a source having a nonuniform intensity vs. wavelength characteristic, said spectrogram being in the form of a photographic transparency and having a wavelength axis with spectral lines at right angles thereto, said apparatus comprising; a first transducer for converting incident light into an electrical signal of magnitude proportional to the light intensity; means for illuminating said spectrogram with collimated monochromatic light; an opaque plate having a narrow slit; means forming an image of said illuminated spectrogram on said plate with the wavelength axis of the spectrogram normal to said slit; said illuminating means, said spectrogram, said plate and said transducer being so positioned that light passing through the spectrogram and the narrow slit falls on said first transducer; a compensating spectrogram, in the form of a photographic transparency, of the light emitted by the said source used in making said spectrogram; a second transducer similar to said first transducer; means for illuminating said compensating spectrogram with collimated monochromatic light; an opaque plate having a slit slightly wider than the slit in the previously mentioned opaque plate; means forming an image of said illuminated compensating spectrogram on the said plate with the wavelength axis normal to said slit; said illuminating means, said compensating spectrogram, said plate and said second transducer being so positioned that light passing through the compensating spectrogram and the slit falls on said second transducer; drive means for moving said spectrogram and said compensating spectrogram at the same constant speed relative to their associated slits and in directions normal thereto while maintaining both slits at equal positions on the wavelength axes of the spectrogram; a subtraction network coupled to the outputs of said first and second transducers for obtaining a signal equal to the difference in the output signals of said transducers; a modulatable monochromatic light source; a transmission network having an adjustable threshold and an amplifier connected in cascade between said subtraction network and said modulatable light source; a photographic plate; means providing a light transmitting slit situated between said modulatable light source and said photographic plate; a lens situated between said slit and said photographic plate for forming an image of said slit of predetermined width on said photographic plate; and means coupled to said drive means for moving said photographic plate relative to said slit image at a constant speed and in a direction at right angles to said slit image simultaneously with the movement of said spectrogram and compensating spectrogram, the ratio of the said predetermined width of said slit image to the width of said narrow slit being the same as the ratio of the speed of said photographic plate to the speed of said spectrograms.

3. Apparatus for producing a gray scale representation of the variation in the average silver grain spacing in a photograph, comprising:

(a) a pickup transducer for scanning said photograph and producing an electrical signal that varies in magnitude in accordance with the average silver grain spacing in said photograph, said transducer containing, (1) scanning means for scanning in succession and along a plurality of parallel juxtaposed scanning lines equal juxtaposed elemental areas of said photograph each of sufficient size to include a number of photographic emulsion grains, said scanning means employing a scanning electron beam in the scanning process;

(b) means for generating and applying to said scanning means a stepped scanning voltage for effecting said scanning and blanking pulses for blanking said electron beam when said scanning means is moving between adjacent elemental areas, comprising:

(1) a capacitor across which said stepped voltage is generated,
 (2) a first normally nonconductive transistor connected in a series circuit with said capacitor and a source of direction current,
 (3) a second normally nonconductive transistor connected in shunt to said capacitor,
 (4) means for generating a first series of short duration voltage pulses of constant repetition rate and for applying said pulses to said first transistor for rendering it conductive for the duration of each pulse,
 (5) means for generating a second series of short duration voltage pulses of constant repetition rate much lower than the repetition rate of the pulses of said first series and for applying said second series of pulses to said second transducer for rendering it conductive for the duration of each pulse,
 (6) the pulses of said first and second series constituting said blanking pulses;

(c) a time discriminator circuit coupled to the output of said transducer for removing pulses of less than a predetermined duration from said electrical signal;

(d) a picture reproducer coupled to the output of said time discriminator for producing a gray scale display of the magnitude of the electrical signal received from said output, said transducer having scanning and blanking means; and (e) means for applying said stepped scanning voltage and said blanking pulses to the scanning and blanking means of said picture reproducer for producing scanning and blanking operations in said reproducer in unison with the scanning and blanking operations in said pickup transducer.

4. Apparatus as claimed in claim 3 in which said time discriminator circuit comprises:

(1) an input coupled to the output of said transducer and an output coupled to said reproducer,
(2) a blanking pulse clipper coupled to the time discriminator input,
(3) a low pass filter having a cut-off selected to reject pulses having a duration less than said predetermined duration coupled to the output of said clipper,
(4) a diode and a parallel connected resistor-capacitor network connected in series across the output of said low pass filter,
(5) a phase inverter coupled to the time discriminator input,
(6) a delay line having a delay slightly greater than the delay introduced by said low pass filter coupled to the output of said phase inverter,
(7) a triode having its control grid biased to anode cut-off,
(8) means for adding the signal across said resistor-capacitor network to the signal at the output of said delay line and for applying the sum to the grid of said triode,
(9) means for reducing the signal at the anode of said triode by an amount equal to the gain of said triode, and
(10) means for adding said reduced signal to the signal at the output of said delay line and applying the sum to the time discriminator output.

5. Apparatus as claimed in claim 3 in which said time discriminator circuit comprises:

(1) an input coupled to the output of said transducer and an output coupled to said reproducer,
(2) a blanking pulse clipper coupled to the time discriminator input,
(3) a low pass filter having a cut-off selected to reject pulses having duration less than said predetermined duration coupled to the output of said clipper,
(4) a phase inverter coupled to the output of said filter,
(5) a diode and a parallel connected resistor-capacitor network connected in series across the output of said phase inverter,
(6) a delay line having a delay slightly greater than the delay introduced by said filter coupled to the time discriminator input,
(7) a triode having its control grid biased to anode cut-off,
(8) means for adding the signal across said resistor-capacitor network to the signal at the output of said delay line and for applying the sum to the grid of said triode, and
(9) means for applying the signal at the anode of said triode to the time discriminator output.

6. Apparatus for producing a gray scale representation of the variation in the average silver grain spacing in a photograph, comprising:

(a) a pickup transducer for scanning said photograph and producing an electrical signal that varies in magnitude in accordance with the average silver grain spacing in said photograph, said transducer containing,
  (1) scanning means for scanning said photograph along a plurality of parallel juxtaposed scanning lines with a constant velocity scanning spot having an area including a plurality of photographic emulsion grains, said scanning means employing a normally blanked scanning electron beam in the scanning process;
(b) means for generating and applying to said scanning means a sawtooth wave for effecting said scanning;
(c) means for periodically unblanking said scanning beam for a period of time that is short relative to the time required for said scanning spot to traverse the spot dimension and at an unblanking repetition interval approximately equal to the time required for the scanning spot to traverse the spot dimension; and
(d) a picture reproducer having scanning and unblanking means operated in unison with the scanning and unblanking operations of said transducer for receiving said electrical signal and producing a gray scale display of its magnitude variation.

References Cited in the file of this patent

UNITED STATES PATENTS 2,626,989    Brown _____ Jan. 27, 1953

FOREIGN PATENTS 792,423    Great Britain _____ Mar. 26, 1958

OTHER REFERENCES

"Electronic Contrast Selector," R. K. H. Gebel, W.A.D.C. Tech. Note 58–100, April 1958.